Figure 1:
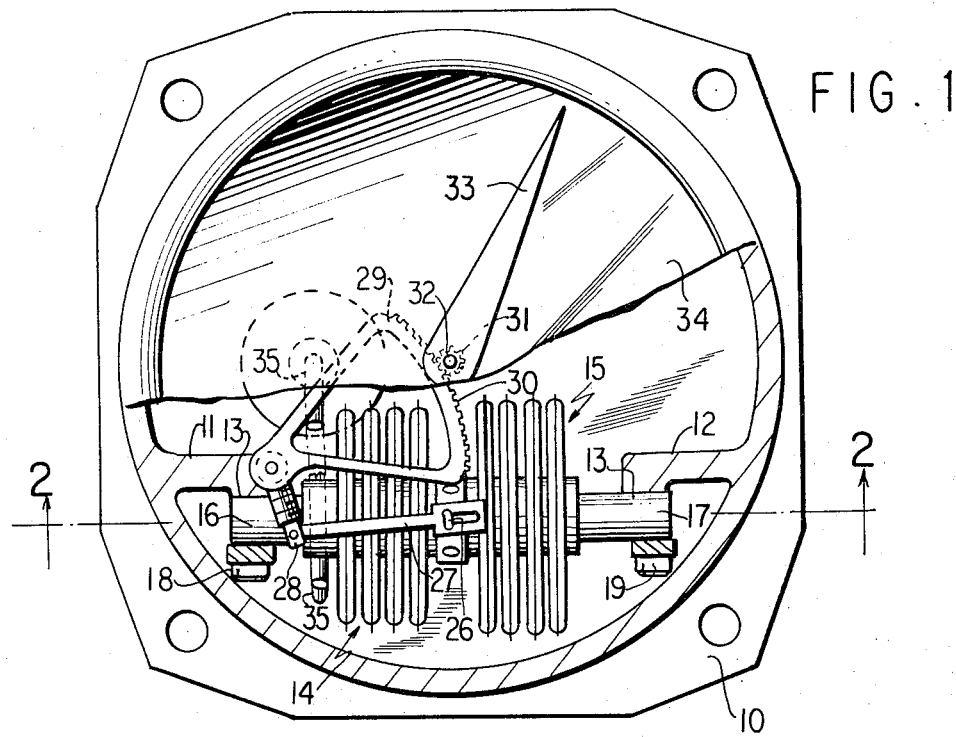

Nov. 28, 1967  R. D. WAITE ET AL  3,354,722

DUAL MANIFOLD PRESSURE GAUGE

Filed Oct. 24, 1965

INVENTORS
RALPH D. WAITE
LEON D. JOHNSON
BY
ATTORNEYS

United States Patent Office 3,354,722
Patented Nov. 28, 1967

3,354,722
DUAL MANIFOLD PRESSURE GAUGE
Ralph D. Waite, Sellersville, and Leon D. Johnson, Perkasie, Pa., assignors to Ametek, Inc., New York, N.Y., a corporation of Delaware
Filed Oct. 24, 1965, Ser. No. 504,891
8 Claims. (Cl. 73—407)

This invention relates to pressure gauges and particularly to an improved dual manifold pressure gauge.

Dual manifold pressure gauges usually employ opposed bellows type pressure responsive means that provide a differential response to dual conditions, the resultant of which acts through usual gauge movement means to operate an indicating needle or the like mounted for movement over an indicating chart.

Bellows means for use in gauges of this type generally employ a stud means at each end thereof. One acts to support the bellows means while the other transmits the movement of the bellows means to linkage forming part of the gauge movement.

Opposed bellows means are usually mounted in aligned relation so that the movement transmitting studs act jointly on the gauge movement linkage to provide a resultant effect.

Problems arise when such movement transmitting studs are not perfectly aligned because their combined effect produces a force couple that introduces an error into the indicator reading.

The principal object of the present invention is to provide a dual manifold pressure gauge wherein the forces produced by opposing bellows means act in perfect alignment.

Another object of the invention is to provide such a gauge in which the individual bellows means can be adjusted to overcome any misalignment of their motion transmitting studs.

Still another object of the invention is to provide such a gauge in which dual aligned bellows means are employed to actuate gauge movement means, and in which the resultant movement of the aligned bellows is rectilinear.

In one aspect of the invention, a dual manifold pressure gauge may comprise a case or housing in which may be mounted a pair of axially aligned bellows. Each bellows may include a boss at each end thereof, one for each bellows being adapted to be clamped to a support integral with the gauge case, and the other boss of each bellows being adapted to act together to produce a resultant movement incident to each of the bellows means being connected to separate opposed sources of pressure, the differential resultant of which is desired to be measured.

In a further aspect of the invention, the two adjacent bosses of the two bellows means are connected together and have a link attached to them that reacts to the resultant movement of the two bellows means.

In a still further aspect of the invention, the free end of the link is connected to linkage that operates the gauge movement including a toothed quadrant that meshes with a pinion fixed to a spindle. The spindle supports a needle mounted over a dial to measure the resultant movement of the two bellows means.

It often occurs that the bosses on the bellows means as well as the bellows themselves, due to manufacturing discrepancies, produce a resultant movement of the link connected to them that is non-rectilinear, thus introducing errors into the reading on the gauge dial.

In another aspect of the invention, the two adjacent bosses may include eccentric means that mate with each other so that if the true line of force of each bellows means is misaligned, it can be easily brought into alignment with the other by the relative rotary adjustment of each bellows means about the axis of its supporting bosses.

The above, other objects and novel features of the invention will become apparent from the following specification and accompanying drawing which are merely exemplary.

In the drawing:
FIG. 1 is a view of a differential pressure gauge to which the principles of the invention are applied; and
FIG. 2 is a sectional view taken substantially along line 2—2 of FIG. 1.

Referring to the drawing, the principles of the invention are shown as applied to a differential pressure gauge including a case or housing 10. The case 10 may include brackets 11 and 12 mounted diametrically opposite each other. Each of the brackets 11 and 12 may include a bore 13 that are intended to be in aligned relation but which, due to manufacturing discrepancies, may be slightly misaligned.

Pressure responsive means may be mounted in the case 10 in opposed relation, and in the embodiment disclosed are shown as bellows means 14 and 15. Bellows means 14 and 15 are of conventional construction and include bosses 16 and 17 on each of their one ends. The bosses 16 and 17 fit within bores 13 in which they are clamped by screws 18 and 19.

Figure 2:
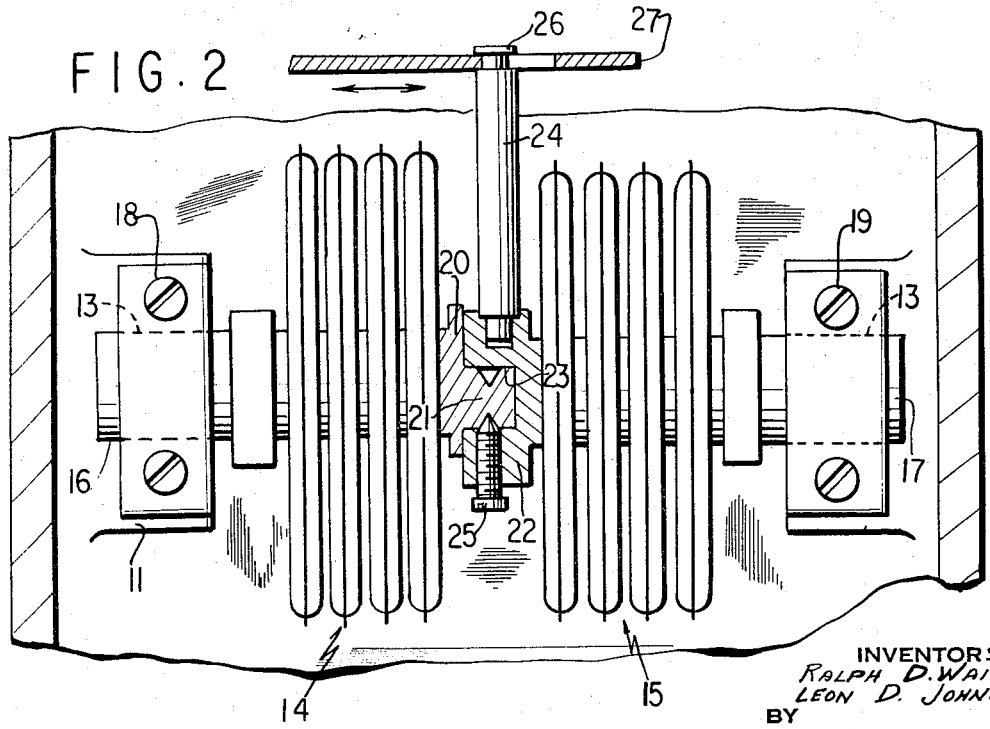

Referring to FIG. 2, the bellows means 14 may include a boss 20 at its end opposite that to which boss 16 is connected. Boss 20 may include a male element 21 that is eccentric to the axis of the bellows means 14. Bellows means 15 may include a boss 22 at its end opposite that to which boss 17 is connected. The boss 22 may include a recess 23 adapted to receive the eccentric element 21. A link 24 may be connected to the boss 22 by any suitable means so that it may remain in a fixed position while the bellows means 15 can be turned about the axis of stud 17. A set screw 25 in boss 22 may fix it to the eccentric 21 of boss 20 in any rotative adjusted position.

It is essential that the free end 26 of link 24 move along a rectilinear path parallel to the axis of the mountings or brackets 11, 12 by the conjoint action of bellows means 14 and 15. Accordingly, by loosening screws 18, 19 and 25 and turning the bellows means 14 and 15 relative to each other, the eccentric 21 acting in mating recess 23 can be used to ensure that the resulting action of bellows means 14 and 15 causes the end 26 of link 24 to move along the desired rectilinear path.

Referring to FIG. 1, the free end 26 of link 24 is connected to one end of a link 27, the opposite end of which is connected to a crank 28 that is rigidly attached to a quadrant 29 forming part of the gauge movement. Quadrant 29 includes gear teeth 30 that mesh with a pinion 31 fixed to a spindle 32. A needle 33 is fixed to spindle 31 and rides over a dial 34 on the face of the gauge.

The bellows means 14 may include a line 35 leading out through the back of case 10 and which is adapted to be connected to a source of pressure that is to be measured in relation to atmospheric pressure in bellows means 15 or another source of pressure connected to bellows means 15 in the same way that line 35 is connected to bellows means 14.

Also, the eccentric could be located (not shown) at either mounting end or at both ends.

The invention can be used with other types of opposed diaphragms, including differential diaphragms.

Although the various features of the improved gauge have been shown and described in detail to fully disclose one embodiment of the invention, it will be evident that changes may be made in such details and certain features may be used without others without departing from the principles of the invention.

What is claimed is:

1. A differential gauge comprising in combination, a case; aligned supporting means mounted on each side of the transverse centerline of said case; bellows means including means at each end thereof adapted to be connected to the respective supporting means such that each may be rotatably adjusted relative to the other; supporting means connecting the opposite ends of said bellows means together as well as to a link; linkage connecting said link to the movement of said gauge; and means forming part of said bellows supporting means for ensuring movement of said link along a rectilinear path parallel to the axis of said supporting means when said bellows means move due to different pressures within said bellows means.

2. A differential gauge comprising in combination, a case; aligned supporting means mounted on each side of the transverse centerline of said case; bellows means including means at each end thereof adapted to be connected to the respective supporting means such that each may be rotatably adjusted relative to the other; means connecting the opposite ends of said bellows means together as well as to a link; linkage connecting said link to the movement of said gauge; and means forming part of said bellows connecting means for ensuring movement of said link along a rectilinear path parallel to the axis of said supporting means when said bellows means move due to different pressures within said bellows means.

3. A differential gauge comprising in combination, a case; aligned supporting means mounted on each side of the transverse centerline of said case; bellows means including means at each end thereof adapted to be connected to the respective supporting means such that each may be rotatably adjusted relative to the other; supporting means connecting the opposite ends of said bellows means together as well as to a link; linkage connecting said link to the movement of said gauge; and eccentric means forming part of said bellows supporting means for ensuring movement of said link along a rectilinear path parallel to the axis of said supporting means when said bellows means move due to different pressures within said bellows means.

4. A differential gauge comprising in combination, a case; aligned supporting means mounted on each side of the transverse centerline of said case; bellows means including means at each end thereof adapted to be connected to the respective supporting means such that each may be rotatably adjusted relative to the other; means connecting the opposite ends of said bellows means together as well as to a link; linkage connecting said link to the movement of said gauge; and eccentric means forming part of said bellows connecting means for ensuring movement of said link along a rectilinear path parallel to the axis of said supporting means when said bellows means move due to different pressures within said bellows means.

5. A differential gauge comprising in combination, a case; aligned supporting means mounted on each side of the transverse centerline of said case; bellows means including means at each end thereof adapted to be connected to the respective supporting means such that each may be rotatably adjusted relative to the other; a boss at the free end of one of said bellows means having an axial recess therein; a boss at the free end of the other of said bellows means including an eccentric stud thereon adapted to be received within said axial recess; a link connected to one of said bosses; linkage connecting said link to the movement of said gauge; and means on said supporting means for locking the corresponding bellows means in any adjusted rotary position.

6. A differential gauge comprising in combination, a case; aligned supporting means mounted on each side of the transverse centerline of said case; bellows means including means at each end thereof adapted to be connected to the respective supporting means such that each may be rotatably adjusted relative to the other; means connecting the opposite ends of said bellows means together as well as to a link; linkage connecting said link to the movement of said gauge; eccentrically mounted means forming part of said bellows connecting means for ensuring movement of said link along a rectilinear path parallel to the axis of said supporting means when said bellows means move due to different pressures within said bellows means; and means for locking said eccentrically mounted means in any rotary adjusted position.

7. A differential gauge comprising in combination, a case; aligned supporting means mounted on each side of the transverse centerline of said case; bellows means including means at each end thereof adapted to be connected to the respective supporting means such that each may be rotatably adjusted relative to the other; a boss at the free end of one of said bellows means having an axial recess therein; a boss at the free end of the other of said bellows means including an eccentric stud thereon adapted to be received within said axial recess; a link connected to one of said bosses; linkage connecting said link to the movement of said gauge; means on said supporting means for locking the corresponding bellows means in any adjusted rotary position; and means for locking said eccentric pin to the stud having said recess therein in any rotary adjusted position.

8. A differential gauge comprising in combination, a case; aligned supporting means mounted on each side of the transverse centerline of said case; bellows means including means at each end thereof adapted to be connected to the respective supporting means such that each may be rotatably adjusted relative to the other; a boss at the free end of one of said bellows means having an axial recess therein; a boss at the free end of the other of said bellows means including an eccentric stud thereon adapted to be received within said axial recess; a link adjustably connected to one of said bosses; linkage connecting said link to the movement of said gauge; and means on said supporting means for locking the corresponding bellows means in any adjusted rotary position.

No references cited.

LOUIS R. PRINCE, *Primary Examiner.*

D. CORR, *Assistant Examiner.*